United States Patent [19]
Hederer et al.

[11] Patent Number: 5,885,642
[45] Date of Patent: Mar. 23, 1999

[54] PROCESS FOR IMPROVED SEPARATION OF STACKED FOOD SLICES

[75] Inventors: Brian H. Hederer, Loyal; Mitchell L. Zegers, Marshfield, both of Wis.

[73] Assignee: Land O'Lakes, Inc., Arden Hills, Minn.

[21] Appl. No.: 611,842

[22] Filed: Mar. 8, 1996

[51] Int. Cl.$^6$ .................................................. A23C 19/14
[52] U.S. Cl. ..................... 426/582; 426/383; 426/517; 426/518
[58] Field of Search ............................... 426/87, 144, 237, 426/245, 248, 582, 383, 512, 515, 517, 518, 76; 99/452, 460–466

[56] References Cited

U.S. PATENT DOCUMENTS

| | | | |
|---|---|---|---|
| 1,087,335 | 2/1914 | Swartz | 426/144 |
| 2,705,203 | 3/1955 | Heidrich et al. | 99/179 |
| 2,799,586 | 7/1957 | Hensgen et al. | 426/515 |
| 2,983,614 | 5/1961 | Hensgen et al. | 426/515 |
| 3,900,574 | 8/1975 | Warwick | 426/515 |
| 3,946,855 | 3/1976 | Weil | 198/34 |
| 3,956,518 | 5/1976 | Goldbach | 426/518 |
| 3,962,751 | 6/1976 | Wagner | 426/144 |
| 3,993,786 | 11/1976 | Arenson | 426/99 |
| 4,046,923 | 9/1977 | Meng et al. | 426/130 |
| 4,111,087 | 9/1978 | Pankratz et al. | 83/210 |
| 4,364,723 | 12/1982 | Louis et al. | 425/384 |
| 4,541,329 | 9/1985 | Mongiello | 99/455 |
| 4,543,864 | 10/1985 | Hochanadel et al. | 83/91 |
| 4,583,435 | 4/1986 | Fessler | 83/90 |
| 4,735,817 | 4/1988 | Smith | 426/517 |
| 4,959,229 | 9/1990 | Reddy et al. | 426/39 |
| 4,964,334 | 10/1990 | Jay | 99/459 |
| 4,973,481 | 11/1990 | Hunt et al. | 426/144 |
| 4,994,288 | 2/1991 | Graham, III et al. | 426/249 |
| 5,000,086 | 3/1991 | Bartling | 99/455 |
| 5,032,417 | 7/1991 | Jay | 426/495 |
| 5,112,632 | 5/1992 | Meli et al. | 426/392 |
| 5,114,307 | 5/1992 | Meli et al. | 414/793.1 |
| 5,182,128 | 1/1993 | Laplace | 426/410 |
| 5,347,792 | 9/1994 | Meli et al. | 53/450 |
| 5,393,589 | 2/1995 | Zeller et al. | 428/192 |
| 5,440,860 | 8/1995 | Meli et al. | 53/451 |

FOREIGN PATENT DOCUMENTS

| | | | |
|---|---|---|---|
| 28 47 286 | 5/1979 | Germany | 426/144 |
| 19700 | 9/1983 | United Kingdom | 426/512 |

OTHER PUBLICATIONS

*The Good Cook Techniques & Recipes: Candy*, published 1981, by Time–Life Books, see p. 76.

Primary Examiner—William H. Beisner
Attorney, Agent, or Firm—Kinney & Lange, P.A.

[57] ABSTRACT

The present invention includes a process for enhancing the ability to separate adjacent stacked food slices such as cheese slices. The process includes forming elevated surfaces or depressed surfaces on adjacent slices that are to be placed in a stack.

16 Claims, 3 Drawing Sheets

PROCESS FOR IMPROVED SEPARATION OF STACKED FOOD SLICES

BACKGROUND OF THE INVENTION

The present invention relates generally to a method for enhancing the ability to separate adjacent food slices such as cheese slices. More particularly, the present invention relates to a method of producing raised areas or depressions on food slices to enhance the separation of adjacent slices in a stack of slices.

Cheese has played an important role in satisfying the dietary needs of many persons in our society. As used herein, the term "cheese" refers to all types of cheese products that are derived from natural cheese and are typically produced from a molten state and formed into a web. Such products include processed cheese, processed cheese food and processed cheese spread. Typically, such products are sold in stacks of discrete slices.

As used herein, the term "process cheese" refers to cheese that is made by grinding one or more varieties of natural cheese. The ground cheese is then heated and mixed with an emulsifying agent. The ground cheese mixture is then processed until it is homogeneous and exhibits a plastic consistency.

As used herein, the term "process cheese food" refers to a cheese product that is generally formed using the same components and procedure as process cheese. However, cheese food may include additional dairy ingredients, such as cream, milk, or whey. The fat concentration in process cheese food is typically between 23 and 50 percent by weight and the moisture level is up to 44 percent by weight.

As used herein, the term "process cheese spread" refers to a cheese product that is generally similar to process cheese food. However, process cheese spread has a fat level of between 20 and 50 percent by weight and a moisture level of up to 60 percent by weight.

It has been found that packaging cheese in the form of slices makes cheese more convenient for many types of consumption. The ability to produce and market cheese slices has been limited to relatively few types of cheese because of problems relating to adjacent cheese slices sticking together. When the cheese slices stick together, it becomes difficult or impossible for a consumer to separate adjacent cheese slices without damaging the cheese slices.

The ability to package stacks of cheese slices has been found to depend on the concentration of aged cheese used to formulate the ground cheese mixture. As the level of aged cheese is increased, it becomes increasingly more difficult to separate adjacent process cheese slices because the cheese slices tend to stick together to a greater extent. The ability to separate adjacent cheese slices has also been found to decrease when the cheese contains lower levels of fat.

Various methods have been used to prevent undesirable sticking between adjacent cheese slices. For example, separating adjacent cheese slices with a piece of paper or individually wrapping the cheese slices prevents adhesion of adjacent cheese slices. However, these methods increase the cost of manufacturing the cheese slices and necessitate the use of additional materials that must be disposed of after the cheese slices are consumed.

It is also known that applying a coating on the surface of cheese slices reduces adhesion between adjacent cheese slices. One such method is disclosed in Warwick U.S. Pat. No. 3,900,574. Warwick describes applying a thin coating of starch or a mixture of starch and gum to the cheese slices.

It is also known that applying a thin layer of oil to the cheese slice enhances the ability to separate adjacent cheese slices. A drawback of applying substances to the cheese slices is that it is difficult to find substances that do not detrimentally affect the taste or other characteristics of the cheese slices.

Yet another technique, which is disclosed in Goldbach U.S. Pat. No. 3,956,518, includes using a corrugated knife to slice natural cheese into corrugated slices. Goldbach indicates that the natural cheese slices are preferably stacked with the corrugations on adjacent natural cheese slices oriented in a transverse relationship. The transverse corrugation arrangement reduces contact between adjacent natural cheese slices and thereby enhances the ability to separate adjacent natural cheese slices.

SUMMARY OF THE INVENTION

The present invention includes a process for enhancing the ability to separate adjacent food slices. The process includes forming a food slice having a substantially flat surface and then producing either raised areas on the food slices that are elevated from remaining surfaces of the food slice or depressions that are recessed from the remaining surfaces of the food slice so that separation of stacked adjacent food slices is enhanced.

DETAILED DESCRIPTION OF THE PREFERRED EMBODIMENTS

The present invention includes a process for enhancing the ability to separate adjacent food slices such as cheese slices from a stack of slices. The method includes forming raised areas or depressions on such cheese slices. By raised area is meant an area that is elevated with respect to an adjacent area. Likewise, by depression is meant an area recessed with respect to an adjacent area. The cheese slices produced by the method of this invention may be stacked without regard to orientation with respect to adjacently stacked cheese slices. The process of the present invention is suitable for use in conjunction with natural cheese, and cheese such as process cheese, process cheese food, process cheese spread and other cheese products. In addition, the process of the present invention may also be used on other food products that are formed into slices having substantially flat surfaces such as processed meat slices. Such process meats include bologna, ham, turkey, beef and various sausages.

The process of the present invention is preferably used in conjunction with manufacturing a cheese slice from molten cheese, which is prepared using conventionally known materials and processes. In addition, in certain alternative embodiments, the present invention may also be used to form raised areas on natural cheese slices. The molten cheese is formed into a continuous cheese web having a desired thickness, typically, approximately ⅛ of an inch thick. At this point, the continuous cheese web preferably has a substantially flat upper surface and a substantially flat lower surface.

Figure 1:
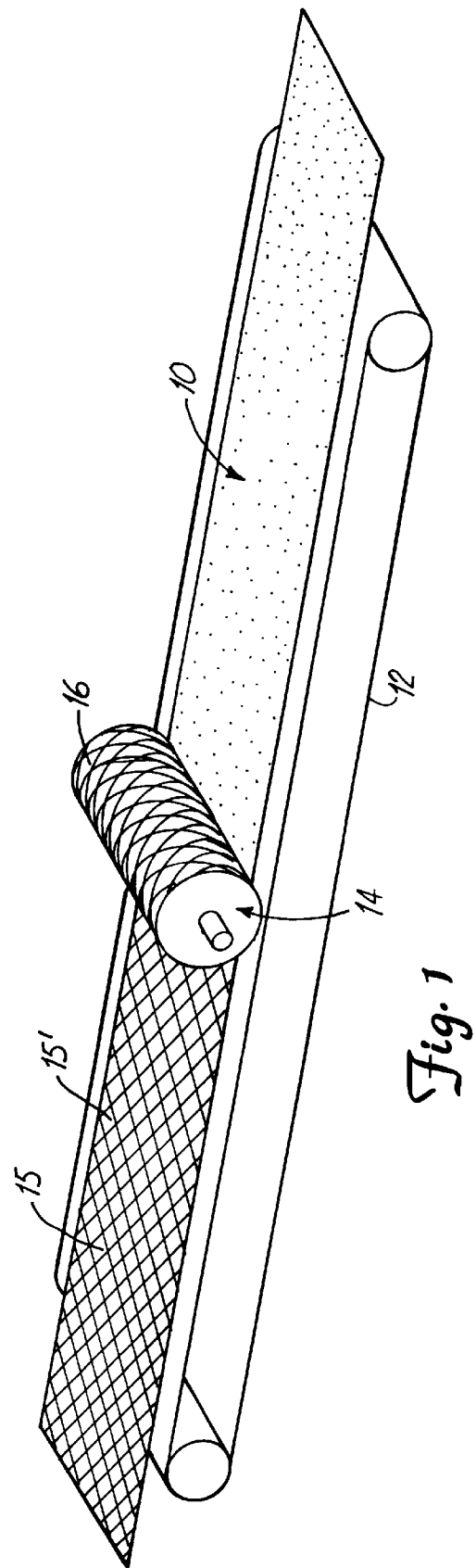
FIG. 1 is a perspective view of an apparatus for producing raised areas on a continuous cheese web.

The continuous cheese web 10 is then conveyed along a conveyor 12, as illustrated in FIG. 1. The conveyor 12 is preferably chilled to assist in cooling the molten cheese to a plastic state. By plastic state is meant that the cheese is sufficiently malleable such that a depression, impression or imprint may be made and the impression or imprint remains without portions of the cheese surface breaking off and adhering to the roller. It will be appreciated that in order for the roller to leave subsequent depressions, imprints or impressions in the cheese surface, the roller's surface must be kept clean, that is free of cheese.

As the continuous cheese web 10 moves along the conveyor 12, the continuous cheese web 10 passes beneath a roller 14 that is rotatably mounted above the conveyor 12. The roller 14 has a knurled outer surface 16. The knurled outer surface 16 includes a plurality of raised and lowered surfaces in the form of peaks and valleys. As is apparent, the outer surface 16 of the roller 14 could contain negative depressions that contain an image such as a trademark which in turn could be in the form of a word or a logo or both. Such depressions in the roller 14 would form raised areas that are elevated from surface area directly adjacent to the raised area. Alternatively, the roller 14 could contain raised areas in the form of images such as a trademark and the roller 14 would form depressions in the cheese surface in the form of such images.

The spacing between the roller 14 and the conveyor 12 is selected so that the knurled outer surface 16 contacts the continuous cheese web 10 as the continuous cheese web 10 passes beneath the roller 14. Contact between the knurled outer surface 16 and the continuous cheese web 10 alters the substantially flat upper surface of the continuous cheese web 10 by imprinting the upper surface with raised areas 15 that correspond with the valleys and depressions 15' that correspond with the peaks on the knurled outer surface 16. While the roller 14 must be sufficiently close to the conveyor 12 so that the knurled surface 16 forms raised areas 15 and depressions 15' on the continuous cheese web 10, it is not critical that the raised areas 15 and depressions 15' be deeply imprinted into the continuous cheese web 10.

The continuous cheese web 10 is then sliced, stacked, and packaged using conventionally known techniques. An advantage of the process of the present invention is that the raised areas 15 and depressions 15' imprinted on the continuous cheese web 10 reduces contact between adjacent cheese slices so that adjacent cheese slices may be separated from each other with a lesser degree of difficulty than cheese slices with substantially flat surfaces. Damage to the cheese slices is thereby minimized.

Figure 2:
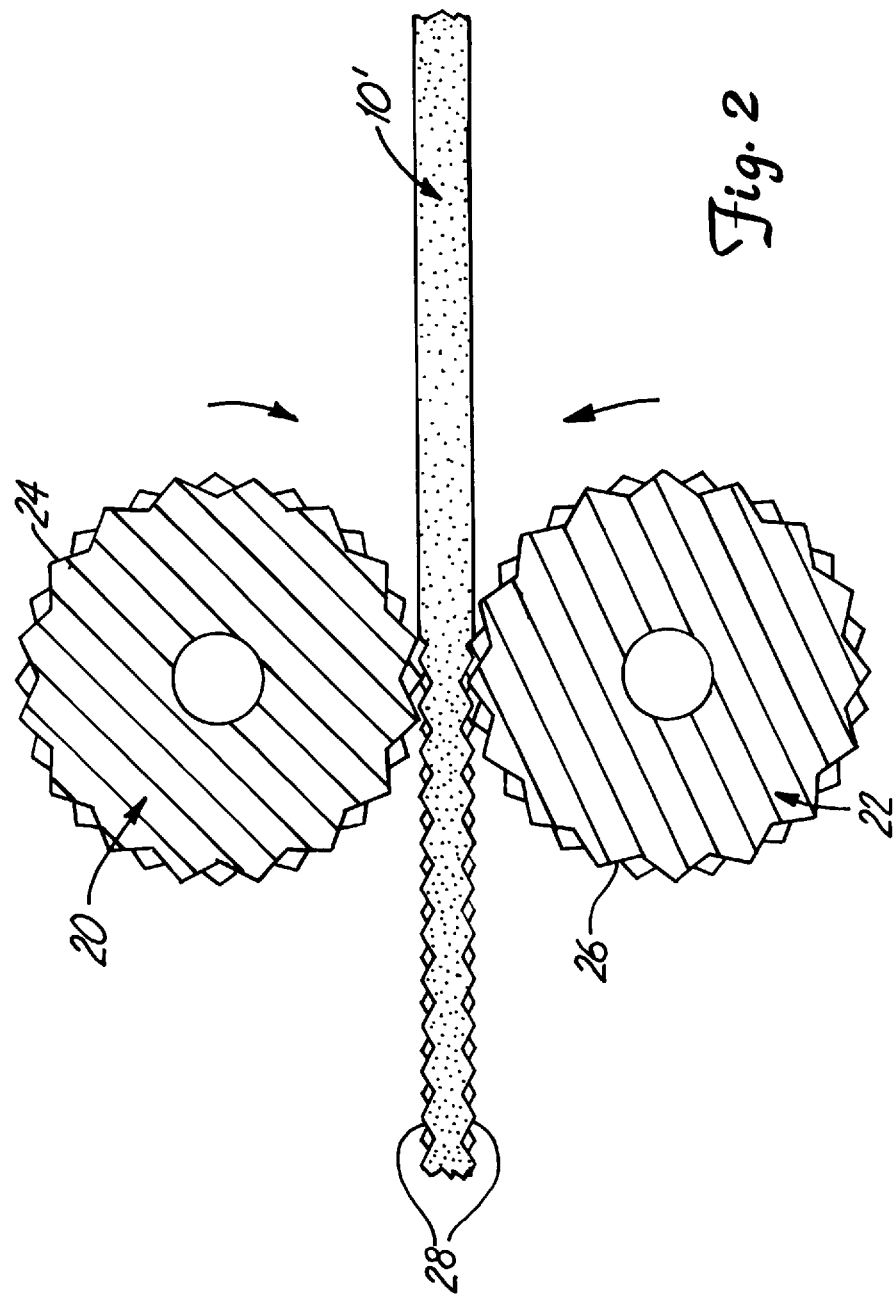
FIG. 2 is a sectional view of an alternative apparatus for producing raised areas on the continuous cheese web.
Figure 3:
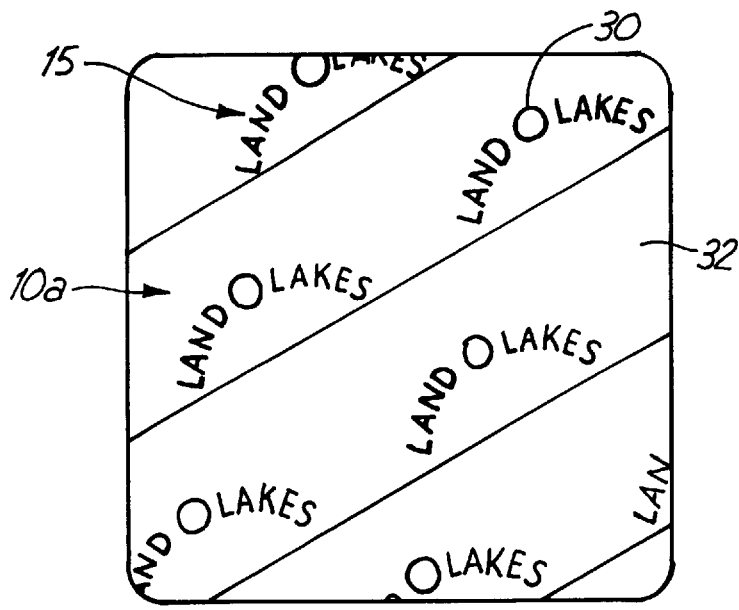
FIG. 3 is a top view of a cheese slice having raised areas in the form of a trademark.
Figure 4:
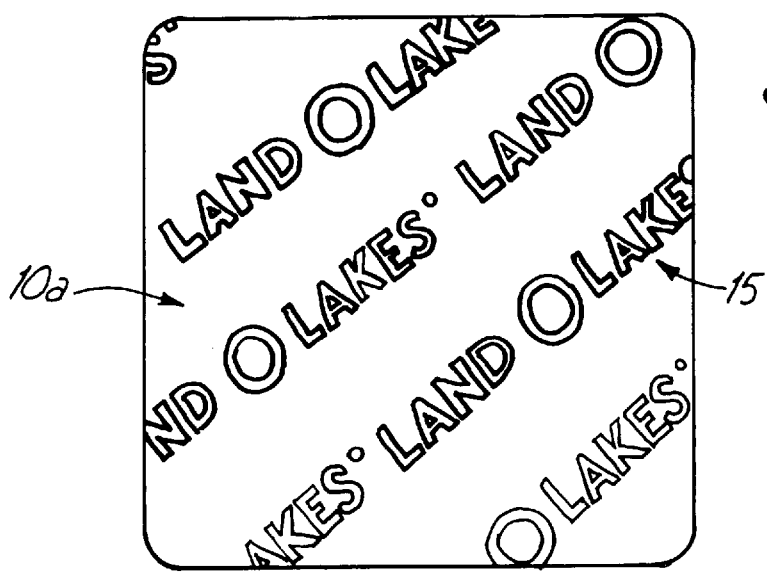
FIG. 4 is a top view of a cheese slice having raised areas in the form of another trademark.

The process of the present invention is also suitable for forming raised areas or depressions on natural cheese slices. Natural cheese slices 10' are passed between an upper roller 20 and a lower roller 22, as illustrated in FIG. 2. Both the upper roller 20 and the lower roller 22 are rotatably mounted and each have a knurled outer surface 24, 26. The knurled outer surfaces 24 and 26 are spaced apart such that when a natural cheese slice 10' is passed between the surfaces 24 and 26, the knurled surfaces form raised areas and depressions on both sides of the cheese slice 10'. It may also be possible to form raised areas and depressions on both sides of a continuous cheese web 10 as described in reference to FIG. 1. However, such a continuous cheese web 10 would need to be sufficiently solidified so that the integrity of the web 10 is kept intact until the web passes between such rollers.

While FIGS. 1 and 2 illustrate rollers 16, 20 and 22 having knurled outer surfaces, other patterns or images may also be provided on the rollers. Furthermore, while FIG. 2 illustrates that the upper roller 20 and the lower roller 22 are positioned in a vertical orientation, a person of ordinary skill in the art will appreciate that the upper roller 20 and the lower roller 22 may be oriented in other configurations so that an upper surface of the continuous cheese web 10 is imprinted before or after a lower surface of the continuous cheese web 10.

Other techniques may also be used to form raised areas or depressions on a cheese surface under the present invention. For example, stamping the surfaces of the cheese slices will produce depressions or raised areas. Still another technique includes pulsing air on the cheese surface while the cheese is sufficiently soft to produce depressions in the cheese. Liquid cheese may also be dropped on the cheese slices to form raised areas.

Depressions or furrows may also be formed using a laser. However, such a technique is not the most desirable since cheese is vaporized.

Furrows may also be formed through the use of plastic fingers engaging the still molten or fluid top surface of the cheese web. A plurality of continuous air streams may also be used to form furrows.

The raised areas or depressions may also be formed as images that convey a commercial message. For example, the images can be in the form of a trademark, word or logo or both. It will be appreciated that imprinting a commercial message on the cheese slices has the advantage that the message remains associated with the cheese slice even when the cheese slice is removed from the package.

Although the present invention has been described with reference to preferred embodiments, workers skilled in the art will recognize that changes may be made in form and detail without departing from the spirit and scope of the invention.

What is claimed is:

1. A process for enhancing the ability to separate stacked food slices made from a flat food web, the process comprising:
   providing a flat food web;
   forming a plurality of raised areas or depressions on a surface of the food web;
   forming discrete food slices from the food web; and
   stacking the discrete food slices, the raised areas or depressions reducing contact between the adjacent food slices to minimize damage when the adjacent food slices are separated.

2. The process of claim 1 wherein the food slices are cheese slices formed from a continuous web of cheese.

3. The process of claim 1 wherein the raised areas or depressions are in the form of images.

4. The process of claim 1 wherein the raised areas or depressions are formed by contacting the surface of the slices with a roller having recessed areas.

5. The process of claim 1 wherein the depressions are formed with bursts of air.

6. The process of claim 1 wherein the depressions are formed by etching the surface of the slices with a laser.

7. The process of claim 1 wherein the food slices are cheese slices and the raised areas are formed by depositing liquid cheese drops on the surface of the cheese slices.

8. A process for improving the ability to separate cheese slices from a stack of cheese slices, the process comprising:
   forming a continuous cheese web having a first substantially flat surface;
   forming first raised areas or first depressions on the first substantially flat surface;

slicing the web to form discrete cheese slices; and stacking the cheese slices, the raised areas or depressions reducing contact between adjacent slices to minimize damage when the adjacent cheese slices are separated.

9. The process of claim 8 wherein the raised areas or depressions are in the form of images.

10. The process of claim 8 and further including forming second raised areas or second depressions on a second substantially flat surface of the cheese web opposite from the first surface.

11. The process of claim 10 wherein the raised areas or depressions are in the form of images.

12. The process of claim 8 wherein the raised areas or depressions are formed by stamping the flat surface.

13. The process of claim 8 wherein the raised areas or depressions are formed by contacting the continuous cheese web with a roller having recessed areas or elevated areas.

14. The process of claim 8 wherein the depressions are formed by subjecting the surface of the web with air streams.

15. The process of claim 8 wherein the depressions are formed by etching the surface with a laser.

16. The process of claim 8 wherein the raised areas are formed by depositing liquid cheese drops on the surface.

* * * * *